Jan. 9, 1945.
J. D. WALKER
2,366,945
DECARBONIZATION OF WATER
Filed May 11, 1940
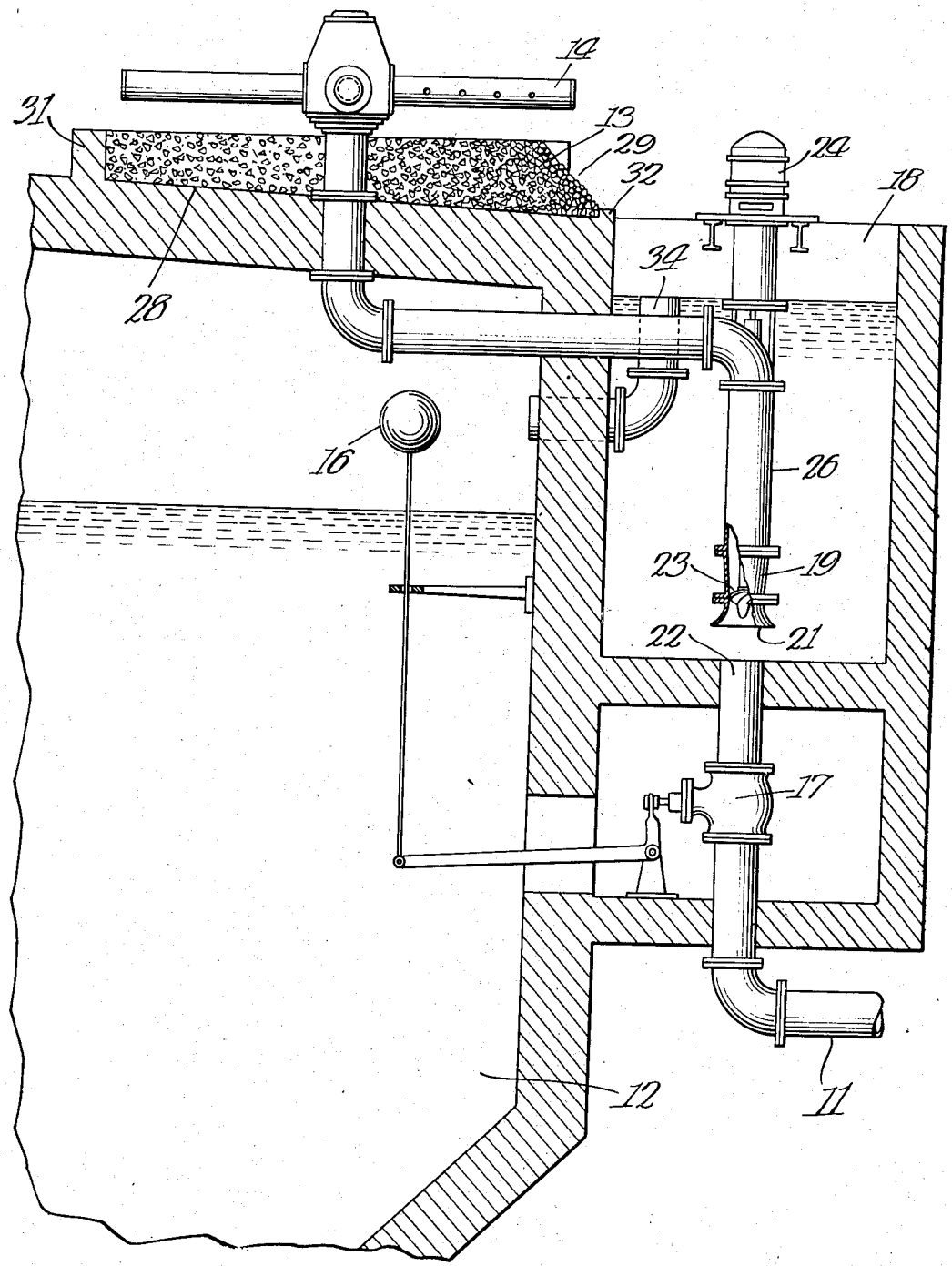
INVENTOR.
James D. Walker
BY Mann, Brown & Co.
ATTORNEYS.

Patented Jan. 9, 1945

2,366,945

UNITED STATES PATENT OFFICE 2,366,945

DECARBONIZATION OF WATER

James D. Walker, Aurora, Ill., assignor to The American Well Works, Aurora, Ill., a corporation of Illinois Application May 11, 1940, Serial No. 334,649

11 Claims. (Cl. 210—16)

Water sometimes has a relatively high content of carbon dioxide which must be removed to make the water suitable for such purposes as drinking. The removal of such carbon dioxide is called decarbonization of water. It has been the practice in the past to accomplish this by causing the water to be sprinkled on, and to trickle through, a succession of drained beds of coke or stone, the presence of the water in a thin film on the stone in some way causing the carbon dioxide to leave the water. The number of successive filters required for satisfactory decarbonization of water by this method has made the decarbonizing plant relatively expensive. According to the present invention, a large part of this expense is saved by making more efficient use of the bed media and by obtaining adequate decarbonization with a single bed. This is accomplished by use of a recirculating system which makes greater use of the single filter than heretofore. The untreated water is led into a well and an equal amount of water passes out of the well into a reservoir of treated water. The water in the well is continuously pumped through a rotary distributor to the surface of the bed of coke or rock.

It might be supposed that this method of recirculation would be inefficient because of the tendency to pump and re-pump water which includes some treated water. It has been found, however, that the plant constructed in accordance with this invention is very efficient. This may be in part because all of the water is spread uniformly on the surface of the bed and in part because the inlet to the pump is so positioned that it draws in all of the untreated water entering the well. The recirculation of treated water, therefore, is never at the expense of leaving untreated water in the well. Since the flow in the recirculating system is much faster than the flow into and out of the well, the water is treated on the average of several times between the time it enters the well and the time it leaves the well to flow to the reservoir, thus insuring adequate decarbonization.

Additional objects and advantages of the invention will be apparent from the following description and from the drawing which comprises a somewhat diagrammatical view of one form of the invention, shown in the illustration, which is a view representing a vertical section through the tanks and decarbonization bed.

A preferred form of the invention has been chosen for illustration and description, in compliance with section 4888 of the revised statutes, but persons skilled in the art will readily perceive other means for using the inventive concept hereof in accomplishing the same results.

The invention is illustrated as arranged for treating a water supply flowing into the equipment through supply pipe 11 and flowing after treatment into reservoir 12. The principal treating medium comprises a bed 13 of coke or rock onto which the water is sprinkled by a conventional type of rotary distributor 14. As the water trickles through the bed 13, the carbon dioxide is removed therefrom, apparently being liberated into the air when the water clings to the stones or rock particles in a thin film.

The water in the reservoir 12 is consumed by passing through the city distribution mains or the like and its level is ordinarily low enough so that float 16 drops and opens valve 17 to allow water to flow from supply pipe 11 into a well 18. An axial flow pump 19 is positioned in the well, preferably having a bell-shaped intake 21 positioned in alinement with the inlet 22 from pipe 11. An impeller 23 in the axial flow pump 19 is driven by a motor 24 and draws water from the well 18 into the pipe 26 forcing the water through the rotary distributor 14 which may be rotated by reaction on the water being squirted out from the spray nozzles on one side of each arm of the rotary distributor. As the water is sprayed onto the decarbonizing bed 13, it trickles through the bed and onto the floor 28 thereof, the floor 28 being preferably inclined toward a notch 29 in the side wall 31. Whether the floor is so inclined or not, the water all flows over a low ridge or lip 32 back into the well 18. From the well 18, the water flows into an outlet pipe 34 through which the water flows into the reservoir 12.

The water is not completely decarbonized by trickling through a single bed and it has been the practice heretofore to sprinkle it over a plurality of beds in succession. The only practical way of sprinkling them seemed to be with stationary spray nozzles. Too much expense would have been involved in providing a plurality of distributors such as the rotary distributor 14. A suitable head of water pressure must be provided for operating each distributor. According to the present invention, the water is satisfactorily decarbonized by using a single decarbonizing bed 13 and recirculating the water through it several times. Although one would expect this system to be somewhat inefficient, due to the mixture of treated water with untreated or less treated water, it has been found that such is not the case.

In fact, it has been found that the rotary distributors make the beds so much more efficient that an average of about three recirculations does the work formerly accomplished by four beds.

One reason for the efficiency is that the sprinkling at any one spot is intermittent so that the water films are thinner. Furthermore, all of the incoming untreated water is pumped to the decarbonizing bed before being mixed throughout the well 18. This is accomplished by aligning the intake 21 with the inlet 22, as mentioned, and by providing an impeller 23 and motor 24 of a capacity exceeding the maximum flow through inlet 22 so that all of the inflowing water and considerable water from the well 18 will be pumped through the pipe 26 to the distributor 14 and bed 13. It follows that all of the water which flows out from outlet 34 has been treated at least once.

The maximum or normal flow from pipe 22 will be very much smaller than the capacity of the pump 19 and hence the great majority of the pumped water will be drawn in from the tank 18 rather than from the inlet 22. In such periods, there will be repeated recirculation of the water in the well 18 so that, on the average, the water in this well will be treated by the bed 13 several times. The capacity of the pump 19 may be made enough higher than the normal flow through the inlet 22 to give any desired number of average recirculations. If a city is accustomed to having water which has been treated by four successive beds, the pump 19 can have about three times the capacity of the normal inflow of fresh water so that the water will, on the average, be treated three times. This has been found to be enough although more can be provided. Less would be enough if the bed is exposed to a partial vacuum.

From the foregoing, it is seen that a satisfactory method of decarbonizing water with a single decarbonizing bed and a single distributor has been provided. The water may be decarbonized to any desired degree. As long as a predetermined amount of carbon dioxide is removed from a given water supply, it makes no difference that some of the water may not be thoroughly treated. It is all mixed together before the consumption anyway so that it is the average that counts. As a matter of fact, the preferred form of the invention illustrated insures treatment at least once of all the incoming water.

No subject matter common to the present application and to applicant's copending application, Serial No. 486,172, is covered herein. Any common invention is to be covered in said application, Serial No. 486,172.

I claim:

1. Apparatus for removing carbon dioxide from water, including a well having an inlet through which water to be decarbonized flows into the well, an outlet for the well, a decarbonizing bed, and means for re-circulating water from the well through the bed and back to the well including a rotary distributor for sprinkling the water onto the bed with substantial uniformity, and a pump having its intake positioned to receive the entire inflow of untreated water to the well and having a sufficient capacity to draw in the entire maximum or normal inflow of untreated water, the outlet being constructed and arranged to maintain a body of water in the well so that the water may be re-circulated over the decarbonization bed several times.

2. Apparatus for removing carbon dioxide from water, including a well having an inlet through which water to be decarbonized flows into the well, an outlet for the well, a decarbonizing bed, and means for re-circulating water from the well through the bed and back to the well including a pump having its intake positioned to receive the entire inflow of untreated water to the well and having a sufficient capacity to draw in substantially more than the entire or normal inflow of untreated water, the outlet being constructed and arranged to maintain a body of water in the well so that the water may be re-circulated over the decarbonization bed several times.

3. Apparatus for removing carbon dioxide from water, including a well having an inlet through which water to be decarbonized flows into the well, an outlet for the well, a decarbonizing bed, and means for re-circulating water from the well through the bed and back to the well, the outlet being constructed and arranged and the well being large enough in capacity to maintain a sufficient body of water in the well to supply an excess of the demand of the re-circulating means over the inflow of untreated water so that at least at times the water may be re-circulated over the decarbonization bed several times.

4. Apparatus for removing carbon dioxide from water, including a well having an inlet through which water to be decarbonized flows into the well, an outlet for the well, a decarbonizing bed, and means for re-circulating water from the well through the bed and back to the well including a pump having its intake positioned to receive the entire inflow of untreated water to the well and having a sufficient capacity to draw in the entire maximum inflow of untreated water.

5. Apparatus for removing carbon dioxide from water, including a well having an inlet through which water to be decarbonized flows into the well, an outlet for the well, a decarbonizing bed, and means for re-circulating water from the well through the bed and back to the well.

6. Apparatus for removing carbon dioxide from water, including a well having an inlet through which water to be decarbonized flows into the well, an outlet for the well, a decarbonizing bed, and means for re-circulating water from the well through the bed and back to the well including a rotary distributor for sprinkling the water uniformly over the surface of the bed.

7. Apparatus for removing carbon dioxide from water, including a well having an inlet through which water to be decarbonized flows into the well, an outlet for the well, a decarbonizing bed and back to the well, and means for re-circulating water from the well through the bed including a pump having its intake aligned with the inlet.

8. Apparatus for removing carbon dioxide from water, including a well having an inlet through which water to be decarbonized flows into the well, an outlet for the well, a decarbonizing bed, and means for re-circulating water from the well through the bed and back to the well including a pump having its intake positioned to receive the entire inflow of untreated water to the well up to the extent of the capacity of the pump.

9. The method of removing carbon dioxide from water which consists in flowing the water into a well with variable rates of flow and withdrawing the water from the well and sprinkling it over a decarbonizing bed and running the water from the decarbonizing bed back into the well whereby the water in the well is re-circulated and treated on an average of more than once by the same bed, and flowing treated water from the well in quantities corresponding to the quantity of untreated water flowing into the well.

10. The method of removing carbon dioxide from water which consists in flowing the water into a well with variable rates of flow and withdrawing the water from the well and sprinkling it over a decarbonizing bed, intermittently at each point but with approximate uniformity as to all points, and running the water from the decarbonizing bed back into the well whereby the water in the well is re-circulated and treated on an average of more than once by the same bed, and flowing treated water from the well in quantities corresponding to the quantity of untreated water flowing into the well.

11. Apparatus for removing carbon dioxide from water, including a well having an inlet through which water to be decarbonized flows into the well, an outlet for the well, a decarbonizing bed, and means for re-circulating water from the well through the bed and back to the well including a rotary distributor for sprinkling the water onto the bed with substantial uniformity, and a pump having its intake positioned to receive the entire inflow of untreated water to the well and having a sufficient capacity to draw in the entire maximum or normal inflow of untreated water, the outlet of the well having an effective height at a predetermined level above the bottom of the well and above the intake, and the volume of the well between said level and the intake being sufficient, with respect to the pumping capacity of the pump, to maintain a pool of water at all times above the intake.

JAMES D. WALKER.